DELAY TIME CONTROL SYSTEM FOR SIGNAL CHECK OR CORRECTION

Inventor
YOSHITERU ISHII
TAKASHI INOKUCHI
By [signature]
Attorney

Inventor
YOSHITERU ISHII
TAKASHI INOKUCHI
By R. P. Morris
Attorney

Inventor
YOSHITERU ISHII
TAKASHI INOKUCHI
By R. P. Morris
Attorney

Inventor
YOSHITERU ISHII
TAKASHI INOKUCHI
By [signature]
Attorney

Inventor
Y. ISHII
T. INOKUCHI
By [signature]
Attorney

United States Patent Office 3,453,592

Patented July 1, 1969

3,453,592
DELAY TIME CONTROL SYSTEM FOR SIGNAL CHECK OR CORRECTION

Yoshiteru Ishii and Takashi Inokuchi, Tokyo, Japan, assignors to Nippon Electric Company, Limited, Minato-ku, Tokyo, Japan, a corporation of Japan Filed Nov. 4, 1963, Ser. No. 321,061
Claims priority, application Japan, Nov. 13, 1962, 37/51,206
Int. Cl. G08b *29/00;* H041 *7/04*
U.S. Cl. 340—146.1 7 Claims

ABSTRACT OF THE DISCLOSURE

This application teaches a delay time control system in which a transmitter-receiver location generates transmission timing pulses related to code frames of the transmitted codes wherein the transmission time pulses occur substantially near the boundary of neighboring code frames. The transmitter-receiver location further generates reception timing pulses which are spaced at uniform intervals equal substantially to the spacing between the transmission timing pulses but which are delayed by an amount representative of the delay caused by the transmission path between the transmitter-receiver location and the remote location to which it is transmitting as well as the inherent delay in the remote location terminal equipment which receives and then retransmits the data back to the transmitter-receiver location. The transmission and reception timing pulses are examined in logical gating circuits in order to operate a time delay adding circuit which adds an arbitrary time delay to incoming code pulses in cases where the reception pulses and transmission timing pulses lie within a predetermined minimum timing region arbitrarily set up between the associated pulse trains.

Figure 1:
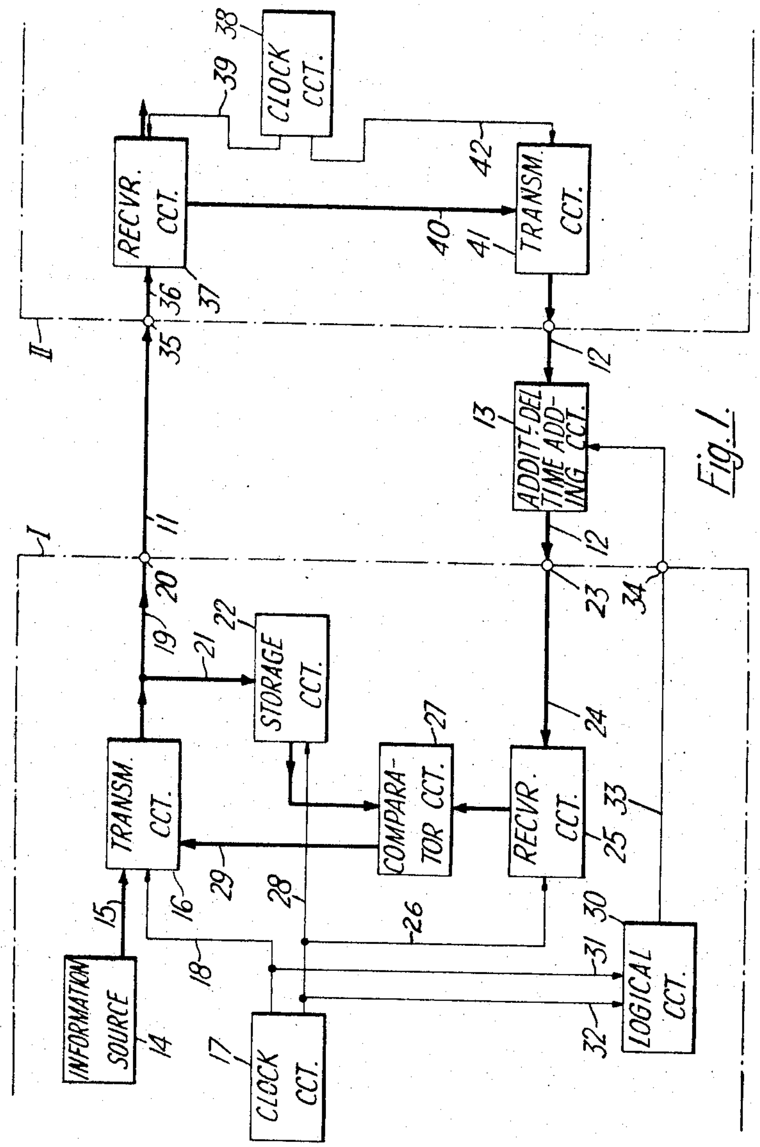

The present invention relates to a delay time control system for a code checking or code correcting loop in a code transmission system, more particularly to a delay time control system for always enabling check or correction of codes, which is adapted to an error-free telegraph, especially to an error-free transmission system for transmitting data.

In the prior art, it is a common practice in a code transmission system continuously to retransmit receiver code signals back to the transmitting end for comparison with the originally transmitted code either character by character or bit by bit while continuing the original transmission. If a discrepancy is found between the corresponding transmitted code and the backwardly transmitted and received code, a retransmission of the code signals from the point at which the discrepancy is found is made to correct the error, and thus the error-free code transmission is achieved. In the above-referred code checking transmission system, a code transmitted from a transmitting end is received again at the transmitting end through a backward transmission loop containing a receiving end. Therefore, it is received again at the transmitting end for checking after a certain delay time which varies in accordance with the distance of the transmission path and the nature of the terminal equipment at the receiving end. If this delay time is always kept constant as in the case, for instance, that the transmission is carried out through a predetermined line and also its terminal equipment is standardized, correct checking may be always enabled by checking at the transmitting end an originally transmitted code with a backwardly transmitted code after the former has been delayed for the constant delay time.

However, a transmission system generally operates through various kinds of line networks, and accordingly the delay time caused by the transmission path is not kept constant, but varies over a wide range. Furthermore, if the standardization of a terminal equipment is not complete, the delay time caused by a portion of the terminal equipment associated with the backward transmission loop, is also not kept constant. The originally transmitted code and the corresponding code backwardly transmitted are usually checked with each other during a given short time period by means of a sampling pulse for checking which pulse has a predetermined time relation with respect to a code time-frame of backward transmission. The sampling pulses generally have a narrow pulse width so that the time frames of the codes need not be perfectly coincident in order to enable checking. In addition, if there exists a delay time longer than one code time frame, it is possible to reduce the time deviation between the originally transmitted code and the backwardly transmitted code to within one-half time frame, by means of a suitable synchronizing code and an automatic delay time regulator device which operates with a step of one code time frame. Therefore, it was generally possible in the prior art to carry out code checking even if the delay time between the original transmission and the reception of the backwardly transmitted code varies over a wide range as described above.

However, since the checking sampling pulse has finite pulse width, if this sampling pulse appears accidentally, as a result of a variation of delay time in a backward transmission loop, at an undeterminable time of the transmitted code, that is, for instance at the boundary time of the transmitted codes when a register having temporarily stored the transmitted code is restored and registers the next following transmitted code, this checking operation becomes impossible. If this accidental unfavorable delay time is maintained constant continuously, the code checking in this transmission system is continuously impossible. Actually, as the delay time caused in the backward transmission loop will fluctuate by a small amplitude due to an environmental condition. Therefore, if the sampling pulse occurs in the neighborhood of the boundary time of the transmitted codes, occasionally the uncheckable condition is encountered. Thus, in the case where the sampling pulse occurs within a given time interval which lies near the boundary time of the transmitted code determined by the amplitude of fluctuation of the delay time in that transmission system it is desirable to provide an additional delay time to the code signals backwardly transmitted for checking to shift the sampling pulse to a position which is in a predetermined time relation to this time frame of the backwardly transmitted code, and thus to avoid the risk of encountering an uncheckable condition. If this additional delay time is selected as one-half time frame, the sampling pulse shifts to about the center of a time frame of the transmitted code and provides the safest condition.

The present invention contemplates, in view of the above-mentioned point, the provision of an automatic control of the delay time caused in a checking loop in order to automatically shift the time position of a sampling pulse so as to avoid the risk of encountering an uncheckable condition.

The above description discloses the disadvantages in the prior art and the way for overcoming them in accordance with the present invention in the case where checking is performed by backwardly transmitting code signals. In another known type of error-free transmission system, the above-described checking by backwardly transmitting code signals is not employed, but instead an error in codes is checked at a receiving end. When the error is detected a code which indicates the detection of an error is transmitted from the receiving end to a transmitting end, the transmitting end being adapted to carry out a retransmission for correction starting from the already transmitted code for which an error was caused, in response to the error informing code. In this system the same type of disadvantages are found in the prior art as in the case of the above-described checking by backwardly transmitting codes, and the novel system of the present invention is similarly applicable to such transmission system to overcome the disadvantages in the prior art. More particularly, as one exemplary system for detecting an error in codes without employing the check by backwardly transmitting codes, there has been a system in which the codes are given redundancy bits to employ the coding for the so-called self error checking system, so that the error may be detected at the receiving end by means of the code itself. In this case, the problems as in the case of the above-described checking by backwardly transmitting codes would not occur, because the error checking at the receiving end is carried out without checking the received codes with other items, and the error may be detected by means of the code itself. However, when it is found according to this system that there exists an error in the codes received at the receiving end, an error detecting code is transmitted backwardly through a separate line (for instance, a line for a backward transmission which is just transmitting another independent information from the receiving terminal office to the transmitting terminal offce) to inform the transmitting end the fact that an error has occurred. On the other hand, at the transmitting end this error detecting code transmitted from the receiving end is read out by means of a sampling pulse, and simultaneously a retransmission is carried out from the corresponding code, to correct the previously transmitted code. It is to be noted that in this case also a transmission loop for correction is formed from a transmitting end through a code error detecting circuit at a receiving end again to the transmiting end, and the delay time in transmission caused within the loop becomes important just as in the first-mentioned case. More particularly, when a code informing the detection of an error at the receiving end has been received and a sampling pulse has sensed its meaning, a transmitter apparatus at the transmitting end has already received information from an information source located in a position several codes later, and is encoding and transmitting it. Therefore, in order to carry out retransmission for correction starting from the corresponding code in response to the detection of an error, the already transmitted codes must be stored at the transmitting end as a provision for retransmission for a predetermined period of time (a time duration corresponding to the delay time possibly caused in the correction loop) just as the already transmitted codes are stored for a predetermined period of time (a time duration corresponding to the delay time caused in the checking loop) for use as a contrast of checking in the case of checking by backwardly transmitting codes.

An automatic regulation of such storing period with a step of one code time unit, has been achieved in the prior art as described previously in the case of checking by backwardly transmitting codes. Therefore, it was also generally possible in the prior art to perform a correction by causing the corresponding code to be retransmitted at the transmitting end when an error has been detected at the receiving end by means of a self error checking code in the above-described manner. However, in the case where the delay time caused in a correction loop varies over a wide range owing to the various values of a line distance and/or a delay time caused in a receiving end equipment, when the time position of a sampling pulse for reading out the error detecting code overlaps the boundary time when a code registered in one register in a transmitted code storage device is just changing to the next following code, it would become impossible to determine whether the code, from which the transmission is to be started for correction, is that just before the boundary time or just after the boundary time. Due to this fact the retransmission of correction may be either one code more or one code less than required. In such a case, a correct retransmission for correction would become impossible. As described previously with reference to checking by backwardly transmitting codes, even if the sampling pulse for reading out the error detecting code is not necessarily coincident with this boundary time, when the sampling pulse approaches the boundary time to such extent as the maximum amplitude of fluctuation of the delay time caused in the loop, also the similar disadvantage would occur. For these reasons, the same problem occurs in the loop for correcting codes as in the loop for checking codes which was previously described, and it will be obvious that this problem may be resolved by applying the present invention analogously according to quite the same principles. The present invention contemplates, as its second mode of embodiment, to carry out an automatic control of the delay time caused in a correcting loop in order to automatically shift the time position of a sampling pulse in any case where there exists a risk of encountering an uncorrectable condition within the above-described meaning.

In the present specification, the term "check or correction" is often used in order to clarify the fact the present invention may be embodied in the above-referred two types of error-free transmission systems including a checking loop and a correcting loop respectively. For convenience in claiming this "check or correction" time it will be referred to as a correlation time. Their systems are different with respect to their concrete construction but nevertheless they suffer from the same disadvantage due to the delay time in their loops. Consequently they may be provided with means for overcoming the disadvantage in a quite analogous manner by applying the basic idea according to the present invention.

Therefore, an object of the present invention is the provision of a novel delay time control system in a code transmission loop for use in check or correction operations, which always enables the successful check or correction of codes even if the delay time caused in said code transmission loop cannot be kept constant.

Another object of the present invention is the provision of a novel delay time control system in a code transmission loop for check or correction, which always enables the check or correction of codes even if the delay time caused in said code transmission loop fluctuates under an effect of environmental conditions.

According to one feature of the present invention, there is provided a delay time control system comprising means for generating reception timing pulses which maintain a predetermined time relation to time frames of incoming code signals and define a check or correction time, means for generating transmission timing pulses containing the pulses characterizing boundary times between transmission code time frames, means for comparing the time relation of said reception timing pulses and said transmission timing pulses and means responsive to a result of said comparison for adding into a check or correction loop, if necessary, an additional delay time.

According to another feature of the present invention, there is provided a delay time control system comprising means for generating reception timing pulses which maintain a predetermined time relation to time frames of incoming code signals and define a check or correction time, means for generating transmission timing pulses containing the pulses characterizing boundary times between transmission code time frames, comparing means for generating an output pulse when said reception timing pulse occurs near said transmission timing pulse within a certain extent of the degree of a fluctuation amplitude of delay time caused in a check or correction loop, and means responsive to said output pulse of said comparing means for adding in said check or correction loop an additional delay time.

According to still another feature of the present invention, there is provided a delay time control system comprising means for generating reception timing pulses which maintain a predetermined time relation to time frames of incoming code signals and define a check or correction time, means for generating transmission timing pulses containing the pulses characterizing boundary times between transmission code time frames, means for generating a first series of pulses having a pulse width of the order of a fluctuation amplitude of delay time caused in a check or correction loop by fixing the leading edges of said reception timing pulses and extending their trailing edges, means for generating a second series of pulses having a pulse width of the order of said fluctuation amplitude by fixing the leading edges of said transmission timing pulses and extending their trailing edges, means for generating a third series of pulses corresponding to the coincident time period between said first series of pulses and said transmission timing pulses, means for generating a fourth series of pulses corresponding to the coincident time period between said second series of pulses and said reception timing pulses, and means for adding in said check or correction loop an additional delay time when either said third series of pulses or said fourth series of pulses exist.

Figure 2A:
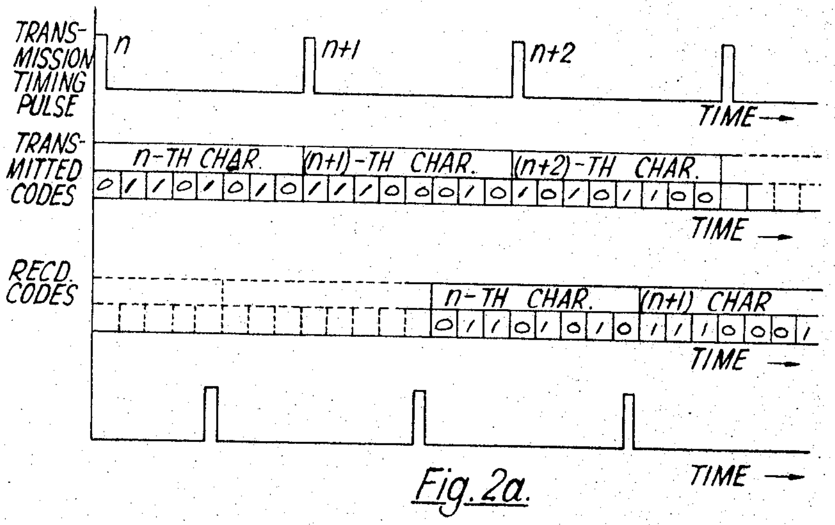
Figure 2B:
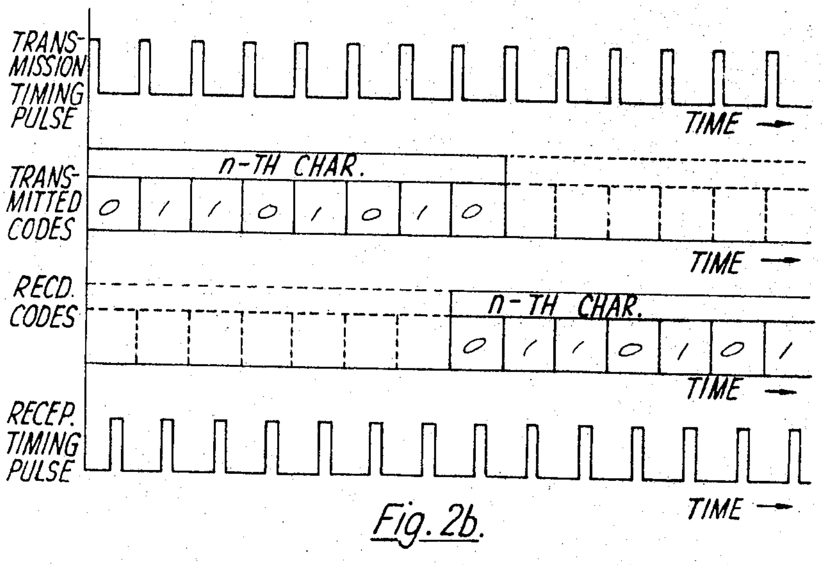
Figure 3:
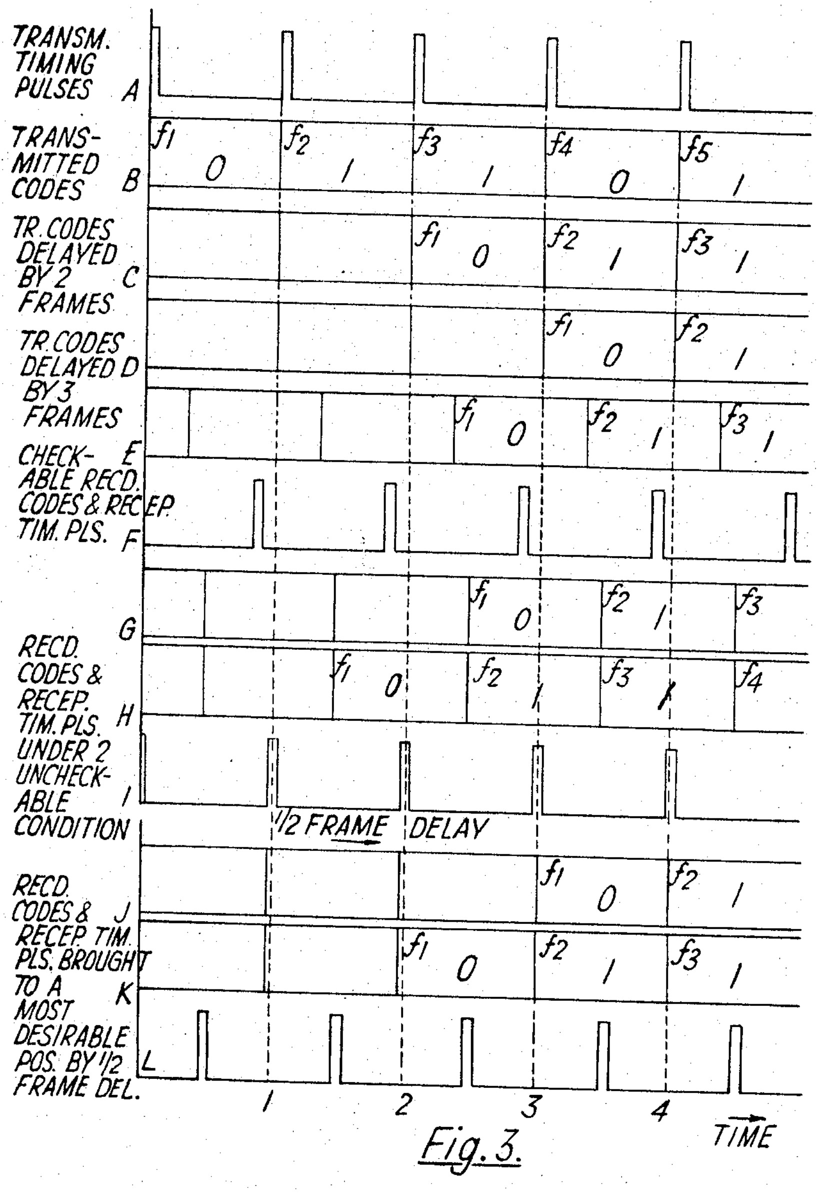
Figure 4:
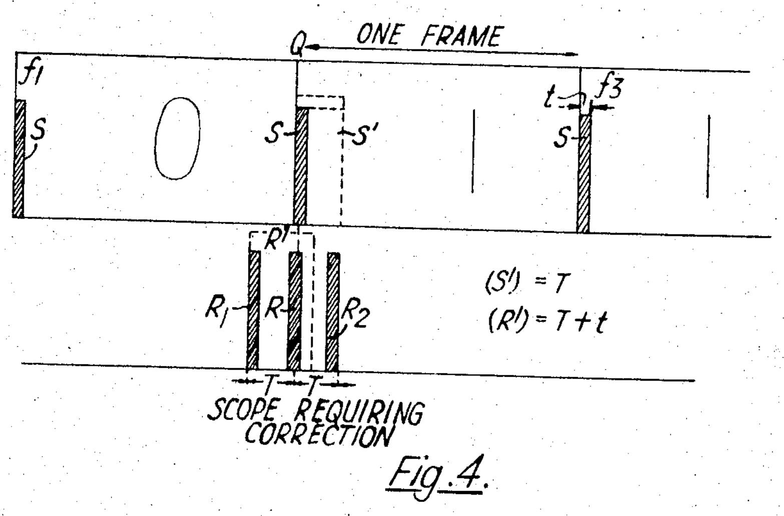
Figure 6:
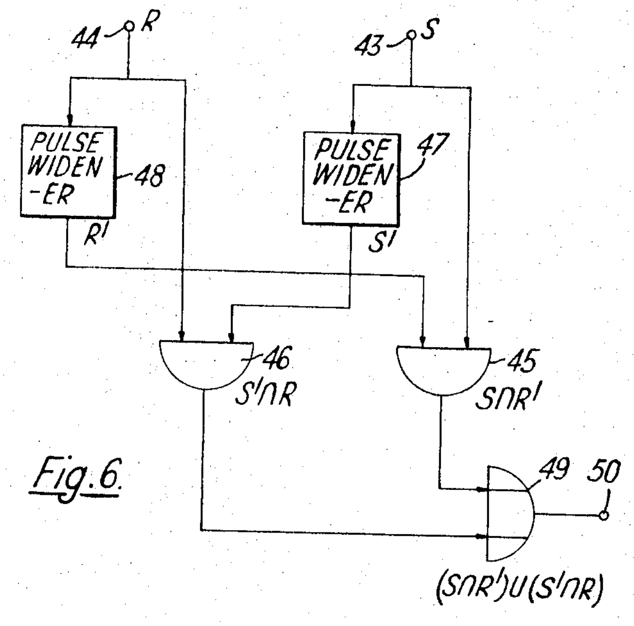
Figure 5:
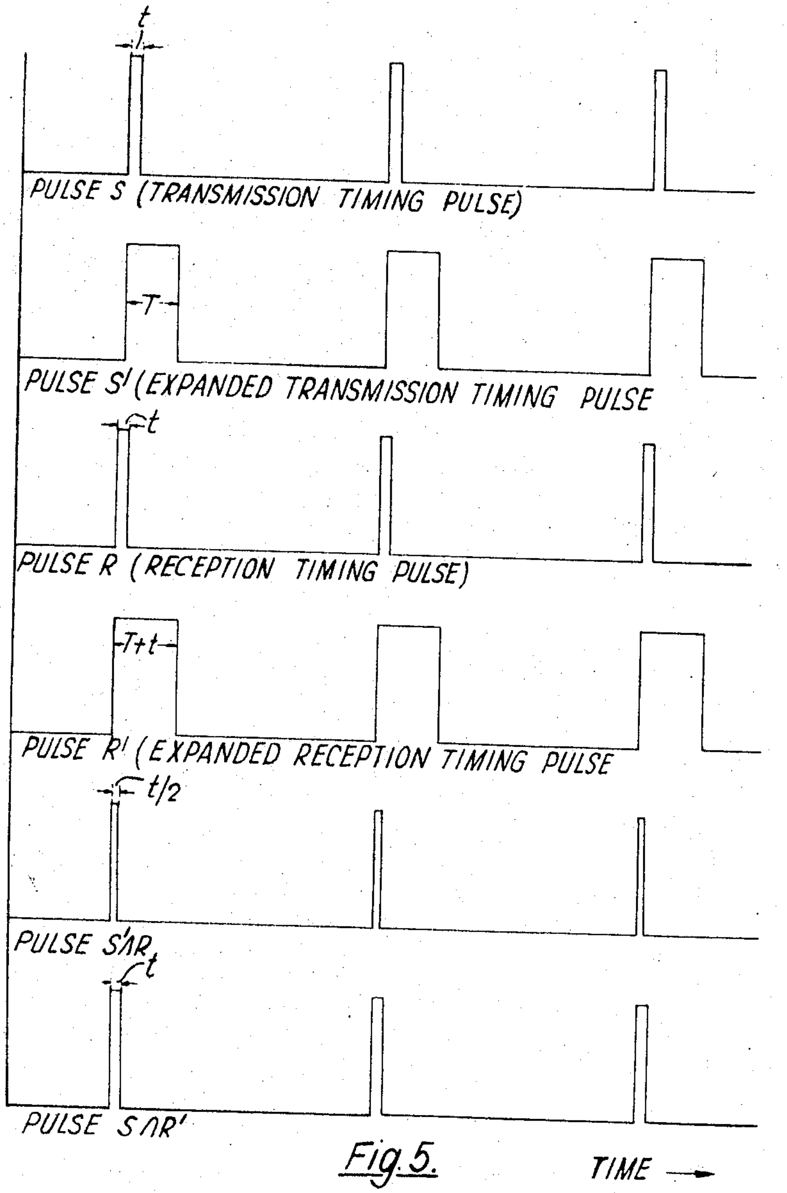

The above and other objects and features of the present invention will become apparent and the invention itself will be best understood from the following specification taken with reference to a specific embodiment of the invention in conjunction with the accompanying drawings, wherein, FIG. 1 shows a block diagram of one embodiment of the present invention, FIG. 2*a* shows a time relation between the transmitted codes and transmission timing pulses, and the received codes and reception timing pulses, in the case of checking character by character, FIG. 2*b* shows a time relation between the transmitted codes and transmission timing pulses, and the received codes and reception timing pulses, in the case of checking bit by bit, FIG. 3 shows a time relation between various codes and timing pulses in connection with the case of checking bit by bit, in a larger scale than that in FIG. 2, when received codes appear in a checkable time relation and in an uncheckable time relation with respect to the transmitted codes, and when the latter time relation was corrected in accordance with the present invention, FIG. 4 is a timing diagram in a still larger scale than that in FIG. 3, for illustrating the scope in which the time relation should be corrected in accordance with the present invention, FIG. 5 shows a timing relation between various pulses which are used in the time delay control according to the present invention, and FIG. 6 is a schematic circuit diagram showing a more detailed construction of the logic circuit in FIG. 1.

Now referring to FIG. 1 in the drawings, there is shown in block diagram form an error-free transmission system of the type which performs checking by backwardly transmitting codes and which incorporates the delay time control system according to the present invention. In this figure, a dash-dot line frame I contains a transmitting terminal equipment, and dash-dot line frame II contains a receiving terminal equipment. Among the lines connecting the respective component blocks, those carrying an information signal are indicated by heavy lines, while those carrying a control signal such as, for example, timing pulses are indicated by thin lines. The arrows associated with the respective lines represent the direction of flow of the information signal or the control signal.

A heavy line 11 outside the two dash-dot line frames indicates an information transmission line from the transmitting end to the receiving end. Another heavy line 12 indicates a backward information transmission line for backwardly transmitting to the transmitting end again the information code signals once received at the receiving end in order to carry out checking of codes to achieve an error-free transmission, and a circuit block 13 inserted into this backward information transmission line 12 is a circuit for adding, if necessary, a certain additional delay time to the backwardly transmitted code signals according to the present invention.

At first in the transmitting terminal equipment I, information to be transmitted is supplied from an information source 14 such as, for example, perforated tape, perforated card, magnetic means and the like, is passed through a lead 15 to a transmitter circuit 16, wherein the information signal is converted into a code signal of the type required by the transmission lines 11 and 12 such as, for instance, serial 8-bit binary code. The transmitter circuit 16 transmits the code signal onto the information transmission line 11 via a lead 19 and a transmission terminal 20, as it maintains in a known manner the time relation defined by transmission timing pulses (see FIGS. 2*a* and 2*b*) which are supplied from a clock circuit 17 through a lead 18. The code signal transmitted from the transmitter circuit 16 onto the information transmission line 11 is also passed via a lead 21 to a storage circuit 22, wherein this code signal is converted into a code type adapted to the transmitting terminal equipment such as, for instance, a parallel 8-bit binary code, and then temporarily stored in this storage circuit 22 for a certain period of time until it later becomes necessary for carrying out the check with the backwardly transmitted code.

The transmitting terminal equipment I also receives at its receiving terminal 23 a code signal backwardly transmitted from the receiving terminal equipment II, through a backward information transmission line 12 for code checking, and this code signal is passed through a lead 24 to a receiver circuit 25. The receiver circuit 25 converts the code signal of the type required by the transmission lines 11 and 12 and incoming through the backward transmission line into a code of the type adapted to the transmitting terminal equipment I, and transfers the converted type of code signal to a comparator circuit 27 making use of the reception timing pulse (see FIGS. 2*a* and 2*b*) having a predetermined time relation to the time frame of the backwardly transmitted code signal and being sent from the clock circuit 17 through a lead 26, as a sampling pulse. The reception timing pulse sent from the clock circuit 17 to the receiver circuit 25, is also sent to the storage circuit 22 via a lead 28, and serves again as a sampling pulse to transfer the code of the type adapted to the transmission terminal equipment I stored in the storage circuit to the comparator circuit 27. The code signals simultaneously extracted from the storage circuit 22 and the receiver circuit 25 respectively and sent to the comparator circuit 27 by means of a sampling pulse (a reception timing pulse), are compared in this comparator circuit 27 with regard to their equality, and if both signals are equal, the comparator circuit 27 produces no control output, whereby the transmission of code signals from the information source 14 via the transmitter circuit 16 and the reception of the code signals for checking at the receiver circuit 25 may be continued further. If the result of comparison in the comparator circuit 27 shows an inequality, a control output signal is produced from the comparator circuit 27 and sent to the transmitter circuit 16 via a lead 29, and the transmitter circuit 16 responds to this control signal to cancel the transmitted codes after the code for which the inequality has been found, and to carry out retransmission starting from the code for which the inequality has been found. All these functions are normal in known prior art systems.

A remaining circuit 30 in the transmission terminal equipment I is a logical circuit for determining whether it is necessary or not to provide an additional delay time for preventing the occurrence of an uncheckable condition according to the present invention. The transmission timing pulses and the reception timing pulses which were sent from the clock circuit 17 via the leads 18 and 26, respectively, to the transmitter circuit 16 and the receiver circuit 25 are applied to this logical circuit 30 via leads 31 and 32 respectively. An output of this logical circuit is in turn applied to the additional delay time adding circuit 13 which was inserted in the above-described backward transmission line, through a lead 33 and a delay time control terminal 34.

In a receiving terminal equipment II, the code signals incoming through the transmission line 11 are received at a receiver circuit 37 through a receiving terminal 35 and a lead 36. This receiver circuit 37 corresponds to the receiver circuit 25 in the transmitting terminal equipment I. In the receiving terminal equipment, is also provided a clock circuit 38 similar to the clock circuit 17 in the transmitting terminal equipment I, from which clock circuit reception timing pulses are sent to the receiver circuit 37 via a lead 39 to serve as sampling pulses. The code signals converted at the receiver circuit 37 into the code type adapted to the receiving terminal equipment II, are directly sent to a transmitter circuit 41 for carrying out a code check, through a lead 40. The transmitter circuit 41 corresponds to the transmitter circuit 16 in the transmitting terminal equipment I, and receives transmission timing pulses from the clock circuit 38 via lead 42 to define time frames of the transmitting codes. The only difference from that in the transmitting terminal equipment I, exists in that the transmitter circuit 16 is supplied with transmitting information from the information source 14, whereas the transmitter circuit 41 is supplied with information to be backwardly transmitted, from the receiver circuit 37. In addition, the code information received at the receiver circuit 37 is, though not shown in the figure, of course delivered to an information utilization circuit so as to be utilized, and the receiver circuit 37 and the transmitter circuit 41 may be connected, if necessary, through an element having a suitable delay time, instead of being connected directly.

Now before the functions of the logical circuit 30 and the additional delay time adding circuit 13 forming the essential part of the present invention are described, the inherent disadvantages of error-free transmission systems of the type of checking by backwardly transmitting codes in the prior art which correspond to the system in FIG. 1 without the logical circuit 30 and the circuit 13, will be described with reference to FIGS. 2*a*, 2*b* and 3.

In practicing the present type of code checking, two typical modes employed are checking character by character or checking bit by bit. In FIG. 2*a*, is illustrated the time relation between the transmission timing pulses and reception timing pulses generated in the clock circuit 17 in FIG. 1, the transmission codes transmitted from the transmitter circuit 16, and the reception codes received at the receiver circuit 25 in connection with said former case. In FIG. 2*b*, is illustrated the similar time relation in connection with said latter case.

Now referring to FIG. 2*a*, the transmission timing pulses control the speed of code transmission, and one period of the series of pulses is equal to one time frame corresponding to one character. The phase relation between the transmission timing pulse and the transmitted character time frame, that is, what position in a time frame corresponding to one character the transmission timing pulse should appear, may be arbitrarily selected so long as it is kept constant. However, in this particular embodiment, the time position of the transmission timing pulse is selected so as to occupy the initial time position in one character time frame, so that the transmission timing pulse may be utilized as a transmission code boundary pulse for use in the detecting function of uncheckable conditions according to the present invention as described later, without separately generating such pulse, and in FIG. 2*a* it is indicated in this time relation. The transmitted codes are illustrated corresponding to $n$th, $(n+1)$th and $(n+2)$th characters, each character in this example consisting of 8 bits.

In FIG. 2*a*, are also illustrated along the same time axis the backwardly transmitted code signals received at the receiver circuit 15, but these received codes have been subjected to the delay time caused by the transmission path and terminal equipment, and therefore, the received codes corresponding to the $n$th and $(n+1)$th characters appear at time positions one character and five bits later (this value is selected by way of example) with respect to the corresponding transmitted codes. In the example of FIG. 2*a*, as the checking of bit by bit is not carried out, it is only necessary to consider the time frames corresponding to the respective characters, though each bit is disclosed in the figure for reference. The reception timing pulses shown at the bottom of FIG. 2*a* are also supplied from the clock circuit 17 in FIG. 1, and have the same period as that of the transmission timing pulses, that is, the period equal to one character time frame of the transmitted codes and the received codes, but their phase relation is maintained in synchronous relation with the received code signals so as to appear at a fixed time position in a time frame of the received code. This reception timing pulse is used as a sampling pulse for carrying out the comparison between the received backwardly transmitting information and the transmission information temporarily stored in the storage circuit 22, and therefore this must occupy such time position in a character time frame that at occurrence of this reception timing pulse the corresponding received character may be determined. More particularly, in this example, since one character may be determined only after 8 bits in that character have been received, this reception timing pulse must occur at the earliest in the time portion corresponding to the eighth bit in one character time frame. In FIG. 2*a*, it is assumed and so illustrated that this reception timing pulse appears from a ⅖ point to a ⅘ point of the eighth bit. It is to be noted that in a known way this reception timing pulse is generated always in synchronization with the received backwardly transmitting code signals, and is adapted to maintain a predetermined time relation with respect to the character time frame of the received code.

FIG. 2*b* is a figure showing the waveforms encountered in checking bit by bit, corresponding to FIG. 2*a*, and will be easily understood from the above description of FIG. 2*a*. In this case, the checking is carried out bit by bit, and there is no need to consider the character time frames though illustrated for reference, instead the respective bit time frames may be considered in the same manner as the respective character time frames in FIG. 2*a* were considered. Accordingly, the transmission timing pulses and the reception timing pulses have a repetition period corresponding to each bit time frame, the transmission timing pulse occupies the position at the front edge of each bit time frame for the above described reasons, and the reception timing pulse is illustrated as occupying from a 5/10 point to a 7/10 point in each bit time frame where the corresponding received information bit may be determined. In this case also the reception timing pulses are generated in synchronization with the code signals backwardly transmitted and received, and are automatically maintained in the above-described phase relation.

As described above, checking on a character by character basis and checking on a bit by bit basis may be attributed to the same checking if one character time frame is considered in correspondence. Therefore, in the following description, the present invention will be described as carrying out bit by bit checking. However, it will be obvious to those skilled in the art that the same results may be equally applied in character by character checking.

Now referring to FIG. 3, there is shown the time relation in FIG. 2*b* in more detail and in larger scale. The pulses A at the top of the figure are transmission timing pulses, which are positioned so as to occupy the front or leading edge portion of the transmitted code time frame for the described reasons. The next following codes B are transmitted codes for which the corresponding code numbers *f*1, *f*2, *f*3, . . . are indicated at the upper left corner of the respective code time frames so that the correspondence between codes may be clarified. The codes C and D are delayed transmitted codes which appear after being subjected to the delaying operation with a step of one code time frame in the storage circuit 22 in FIG. 1, and are used later as a reference of comparison with a backwardly transmitted code. The codes C are those having a delay of two frames, the codes D are those having three frames, and in order to clarify the correspondence to the codes B, the respective code frames are marked with code numbers *f*1, *f*2, *f*3, . . . at their upper left-hand corners. The codes E represent the backwardly transmitting codes received with a delay of 7⁄3 frames with respect to the codes B, and in this case the reception timing pulses are shown thereunder as pulses F occupying from a 15⁄30 point to a 17⁄30 point of one frame. When the above-described time relation between the transmitted codes and the received codes exists, though it is impossible to compare the codes E directly with the codes B, the comparison between the transmitted codes and the received codes may be always carried out definitely, by generating the codes C with a delay of 2 frames from the transmitted codes by means of an automatic regulation function with a step of one time frame utilizing a synchronous code as pointed out in the earlier part of this specification, and by utilizing the reception timing pulses F as sampling pulse for comparing these newly generated codes with the received codes E. Subsequently the codes G and H represent the cases in which the checking with either the transmitted codes B or the codes delayed with a step of one frame C or D becomes impossible as the time relation with the received backwardly transmitting signal is different from that of the codes E. In FIG. 3, as the reception timing pulses appear at the time position occupying from a 15⁄30 point to a 17⁄30 point in a received code time frame as assumed previously, in the case of either the code G or H, the reception timing pulses occupy the time position as shown by the pulses I. Composing this time position with the codes B, C and D, it is a position corresponding to a boundary between code time frames. Therefore, if these reception timing pulses are used as sampling pulses for comparison, the codes B, C, and D which act as a reference of comparison will change their bit status, and thus checking becomes impossible.

According to the present invention, in the cases such as the above-referred received codes G or H, there is provided means for sensing such an uncheckable relation operating the circuit 13 inserted in the backward information transmission line 12 in FIG. 1, and thus shifting the time position of the received codes into a checkable position. The backwardly transmitted codes which have been received after insertion of an additional delay time in this way, are shown as the codes J and K in FIG. 3, the codes J being given an additional delay time of ½ frame with respect to the code G, the codes K being given an additional delay time of ½ frame with respect to the codes H. The duration of this additional delay time may be arbitrarily selected as long as it is adapted to avoid the uncheckable status such as shown by the codes G or H, and not limited to ½ frame as illustrated. However, taking into account the fluctuation of the delay time caused by the transmission path and the terminal equipment as described hereinbelow, it is desirable to carry out a correction so that the reception timing pulses acting as sampling pulses may be separated as far as possible from the position of the boundary between the transmitted codes as indicated by the pulses I. Therefore, if an additional delay time of ½ frame is given, the reception timing pulses are brought to the center position of the transmission code time frames as shown by the pulses L at the bottom in FIG. 3, and thus realize the safest status.

If the above-considered delay time in the signal transmission due to the transmission path and the terminal equipment is always constant, the necessity for correcting the uncheckable status occurs only in the case of the above-described worst status as shown at G, H, and I in FIG. 3. However, in general, the transmission path and the terminal equipment will vary their properties in accordance with a variation of environmental conditions such as a temperature variation, and consequently a fluctuation would appear in the delay time in the signal transmission due to the transmission path and the terminal equipment in accordance with a fluctuation in such environmental conditions. Therefore, even if the reception timing pulses generated synchronously with the received codes do not occupy the position shown at I in FIG. 3, when they are close to the position shown at I in FIG. 3, there occurs a risk of occasionally encountering with an uncheckable status such as the pulses I owing to the fluctuation in a delay time. From such reasons, it is also necessary to shift the reception timing pulses into a safety zone in which the uncheckable status would not occur if they approach the position of pulses I in FIG. 3 to a point within the amplitude of fluctuation in a delay time.

These relations are illustrated in FIG. 4. FIG. 4 shows in larger scale the transmission timing pulse A, the transmitted codes B, and the reception timing pulses I in FIG. 3. In this figure the transmission timing pulses are indicated as a series of pulses S having a pulse width $t$ corresponding to 1⁄35 of one frame duration and positioned at the front edge of the frame, the reception timing pulse is indicated as a pulse R having the same pulse width $t$ and positioned at the boundary between the transmitted code frame, and assuming that the maximum amplitude of the fluctuation in a delay time due to the transmission path and the terminal equipment in a backward code transmission loop is T, a reception timing pulse having its leading edge at the position of $+T$ from the boundary between the transmitted code fames and another reception timing pulse having its trailing edge at the position of $-T$ from the boundary are respectively indicated by pulses $R_1$ and $R_2$. When the reception timing pulse approaches the worst position R to such extent as represented by the pulses $R_1$ or $R_2$, it becomes necessary to carry out a correction for avoiding the uncheckable status as described above. In order to detect such status, the pulse S′ is derived from the pulse S shown in FIG. 4, and the pulse R′ is derived from the pulse R (in this figure, from the pulse $R_1$). The pulse S′ is a pulse having its leading edge coincident with that of the pulse S and its trailing edge coincident with that of the pulse $R_2$, in other words, it is a pulse derived by expanding the pulse width of the pulse S into T as its leading edge is fixed and its trailing edge is extended, and the pulse width of this pulse is represented in the figure symbolically by $(S')=T$. The pulse R′ is a pulse having its leading edge coincident with that of the pulse $R_1$ and its trailing edge coincident with that of the pulse S, in other words, it is a pulse derived by expanding the pulse width of the pulse $R_1$ into $T+t$ as its leading edge is fixed and its trailing edge is extended, and the pulse width of this pulse is represented in that figure symbolically by $(R')=T+t$.

A description will now be given in connection with means for deriving the above-defined pulse S′ and pulse R′ from the pulse S (transmission timing pulse) and pulse R (reception timing pulse) and for determining whether the addition of an arbitrary delay time is required or not by making use of these pulses. As will be apparent from FIG. 4, in cases where the pulse R arrives at or inside the position as indicated by $R_1$ or $R_2$ in FIG. 4 as it approaches pulse S, it is necessary to add an additional delay time taking into account the fluctuation amplitude T of the delay time, while in the case where the pulse R is outside the position as indicated by $R_1$ or $R_2$, there is no need to add any delay. The condition that the pulse R has at least one part of its pulse width positioned within the scope of T in the left direction from the code boundary point Q means that there exists a common part between the pulse R' and the pulse S, the condition that the pulse R has at least one part of its pulse width positioned within the scope of T in the right direction from the code boundary point Q means that there exists a common part between the pulse S' and the pulse R, and thus it is apparent from FIG. 4 that when the pulse R is outside the dangerous region of ±T on both sides of said point Q, neither of the above-referred two kinds of common parts exists. Therefore, the detection of the necessity for adding an additional delay time is equivalent to the detection of a logical condition that the logical sum of the logical product between the pulse S and the pulse R' and the logical product between the pulse S' and the pulse R is not equal to zero. The detection of such logical condition may be easily realized by means of well-known AND gate and OR gate logic. In general, either one of the above-mentioned logical products between the pulse S and the pulse R' and the logical product between the pulse S' and the pulse S will typically occur, but in a certain special case, it may be possible that both types of products appear. This case of producing both detection pulses is illustrated in FIG. 5, in which T is taken assumed to be five times as long as *t*.

The above-mentioned logical function is performed in the logical circuit 30 in the block diagram of FIG. 1. One example of the more detailed structure of the logical circuit is shown in FIG. 6, in which the pulse S (transmission timing pulse) and the pulse R (reception timing pulse) are applied to the input terminals 43 and 44 respectively at the top of the circuit 30, through the leads 31 and 32 in FIG. 1. The pulse S and pulse R are respectively applied to one input of AND gates 45 and 46. The pulse S and pulse R are also supplied to the pulse width conversion circuits 47 and 48 respectively, in which they have their pulse width expanded to produce the pulse S' and pulse R' respectively. The pulse S' and pulse R' are applied to the other input of said AND gates 46 and 45 respectively. Consequently, the AND gate 45 generates an output pulse corresponding to the logical product between the pulse S and pulse R', while the AND gate 46 generates an output pulse corresponding to the logical product between the pulse S' and pulse R. These two output pulses are respectively applied to the inputs of the two input OR gate 49, the output of which is supplied to the output terminal 50. Thus it is obvious that the logical circuit as shown in detail in FIG. 6 and also shown by the block 30 in FIG. 1 generates as its output signal a pulse representing a logical sum of the logical product between the pulse S and pulse R' and the logical product between the pulse S' and pulse R, using the pulse S and pulse R as its input signals. This output signal of the logical circuit 30 appearing at terminal 50, is applied to the additional delay time adding circuit as its control input, through the lead 33 and the delay time control terminal 34 in FIG. 1, and if this control input exists, a predetermined duration (such as ½ frame) of additional delay time is added to the backwardly transmitted codes, regardless of the pulse width of the control input pulse. Of course, if this control input does not exist, the delay time of the circuit 13 is equal to zero and the input code signals are transmitted from its output and without delay. In the above-described manner, by means of the cooperative function of the logical circuit 30 and the additional delay time adding circuit, it becomes possible to maintain such phase relation of the backwardly transmitted and received code signals with respect to the transmitted code time frame that the checking is always possible.

While a principle of the invention has been above described with reference to specific embodiment, it is to be clearly understood that the description has been made only by way of examples, and it is not intended to limit the scope of the invention. For instance, although the additional delay time adding circuit 13 was described as being inserted into the backward information transmission line 12, it is equally possible to insert it into the information transmission line 11.

What is claimed is:

1. A delay time control system for use in communications systems transmitting code signals between remote locations comprising means at one location for generating reception timing pulses which maintain a predetermined time relation to time frames of incoming code signals and define a correlation time, means at said one location for generating transmission timing pulses occurring at boundary times between transmission code time frames, means at said one location for comparing said reception timing pulses and said transmission timing pulses with respect to their time relation; said comparing means comprising means for producing control pulses when said reception and transmission timing pulses occur within a predetermined time period, and means responsive to said control pulses for adding an additional delay time into the communications link; said delay time being substantially less than the duration of a time frame.

2. A delay control device according to claim 1 wherein said reception timing pulses and said transmission timing pulses are of small duration with respect to said code frames, and said predetermined time period begins and ends on opposite sides of the boundary of each transmission code time frame, said means for comparing, comprising a means responsive to transmission timing pulses for widening said transmission timing pulses substantially to said predetermined time period, means responsive to reception timing pulses for widening said reception timing pulses to substantially said predetermined time interval plus the width of said reception timing pulses, separate gating means, one being responsive to the simultaneous application of a transmission timing pulse and a widened reception timing pulse for providing an output signal and the other being responsive to the simultaneous application of a reception timing pulse and a widened transmission timing pulse for providing an output signal, and means for providing a control pulse in response to either or both of said output signals.

3. A delay time control system for delaying return code signals to provide for the proper timing of these signals for comparison with transmitted code signals, comprising means at a transmitting station for generating transmission timing pulses corresponding with the boundary times between successive code time frames, means at the receiving station for returning the transmitted coded pulses, means at the transmitting station for generating reception timing pulses having a predetermined time position with respect to the time frames of said return code signals, means for comparing the time spacing of said reception timing pulses and said transmission timing pulses to produce control pulses when said time spacing is below a given minimum time period, wherein said minimum time period is less than half the duration of a time frame, a delay device in the return path of said return signals, and means controlled by said control signals for operating said delay device to provide a given delay of said signals, wherein said given delay is a fractional part of the duration of a time frame.

4. In a code transmission system having at least first and second locations wherein code signals are retransmitted from the location originating the transmission upon detection of an error and said retransmission is effected by a comparison of a code signal returned to said location originating the transmission from the location receiving, a timing circuit at the location originating transmission for producing first timing pulses having the period of successive code frames of said transmitted code signals and for producing reception timing pulses having a predetermined time position with respect to said returned code signal frames, and means for comparing said returned code signals with said transmitted code signals to derive signals for providing said retransmission, said first timing pulses being located near the boundaries of successive time frames of said transmitted code frames, a delay adding circuit positioned between said comparison circuit and the path of said return signals, a second comparison circuit for comparing the time relation of said first timing pulses and said reception timing pulses for producing a delay control pulse when said pulses lie within a predetermined minimum spacing relative to one another, and means for applying said delay control pulses to said delay adding circuit to cause it to introduce an arbitrary delay into said return code signals.

5. A system according to claim 4, wherein said delay adding circuit adds a delay substantially equal to one half the time duration of a return signal code frame.

6. In a communications system comprised of at least first and second locations having a communications link therebetween;

said first location having means for receiving data from said second location and retransmitting said data back to said second location;

said second location having first means for transmitting data in time frames each of uniform length and each time frame containing at least one bit of binary information;

the improvement comprising second means for generating a first group of timing pulses occurring at spaced intervals and each being positioned near the boundary between adjacent time frames;

third means for receiving data retransmitted from said first location; said retransmitted data being the data originating from said first location delayed as a result of the transmission path and the inherent delay of the receiving and retransmission functions performed at said first location;

said second means including fourth means for generating a second group of timing pulses spaced at timing intervals equal to said first group of timing pulses and each being delayed by an amount related to the delay imposed by said transmission and retransmission functions;

fifth means receiving said first and second groups of pulses for generating an output signal when said pulses from said second pulse group occur within a time period T on either side of an associated pulse from said first group;

adjustable delay means coupled between said second location receiver means and the communications link operable by said output signal to impose an arbitrary delay upon said incoming signals to assure reliable operation of the system.

7. The system of claim 6 wherein said fifth means is comprised of first and second pulse widening means respectively receiving one of said first and second groups of pulses;

a first AND gate receiving the pulse widened outputs of said first group of pulses from said first pulse widening circuit and for receiving the second group of pulses;

a second AND gate receiving the pulse widened outputs of said second group of pulses from said second pulse widening circuit and for receiving the first group of pulses;

an OR gate receiving the outputs of said first and second AND gates to generate an output signal when either of said widened pulses from said second pulse widening circuits overlap in time with an associated unwidened pulse from said second and said first pulse groups, respectively.

References Cited

UNITED STATES PATENTS 3,267,427 8/1966 Hoek et al. -------- 340—146.1

MALCOLM A. MORRISON, *Primary Examiner.*

CHARLES E. ATKINSON, *Assistant Examiner.*

U.S. Cl. X.R.

178—69.5; 325—58; 328—72